(12) United States Patent
Yamashita (10) Patent No.: US 6,184,511 B1
(45) Date of Patent: Feb. 6, 2001

(54) PHOTOELECTRIC CONVERSION APPARATUS

(75) Inventor: Yuichiro Yamashita, Atsugi (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/291,034

(22) Filed: Apr. 14, 1999

(30) Foreign Application Priority Data

Apr. 17, 1998 (JP) .................................................. 10-107513

(51) Int. Cl.$^7$ ............................. G02B 27/40; G03B 13/36
(52) U.S. Cl. .................................. 250/201.2; 250/201.8; 396/97
(58) Field of Search ........................... 250/238, 201.2, 250/201.3, 201.4, 201.5, 201.6, 201.7, 201.8; 396/97; 327/512, 513

(56) References Cited

U.S. PATENT DOCUMENTS 5,412,448 * 5/1995 Kunishige ........................ 396/97
5,914,629 * 6/1999 Maki ........................... 327/512

* cited by examiner

Primary Examiner—F. L. Evans
(74) Attorney, Agent, or Firm—Fitzpatrick, Cella, Harper & Scinto (57) ABSTRACT

A photoelectric conversion apparatus including (A) a semiconductor integrated circuit, for photoelectrically converting an incident optical signal, that includes a first temperature dependent element having a characteristic which exhibits a predetermined change in accordance with a change in temperature and a detection circuit for detecting temperature information, (B) a device arranged outside of the semiconductor integrated circuit, and (C) at least one second temperature dependent element which is arranged inside the device and has a characteristic which exhibits a predetermined change in accordance with a change in temperature. The detection circuit detects temperature information of the first temperature dependent element and temperature information of the at least one second temperature dependent element.

24 Claims, 5 Drawing Sheets

PHOTOELECTRIC CONVERSION APPARATUS

BACKGROUND OF THE INVENTION

1. Field of the Invention

The present invention relates to a semiconductor integrated circuit and photoelectric conversion apparatus for of converting an optical signal into an electrical signal.

2. Related Background Art

Figure 1:
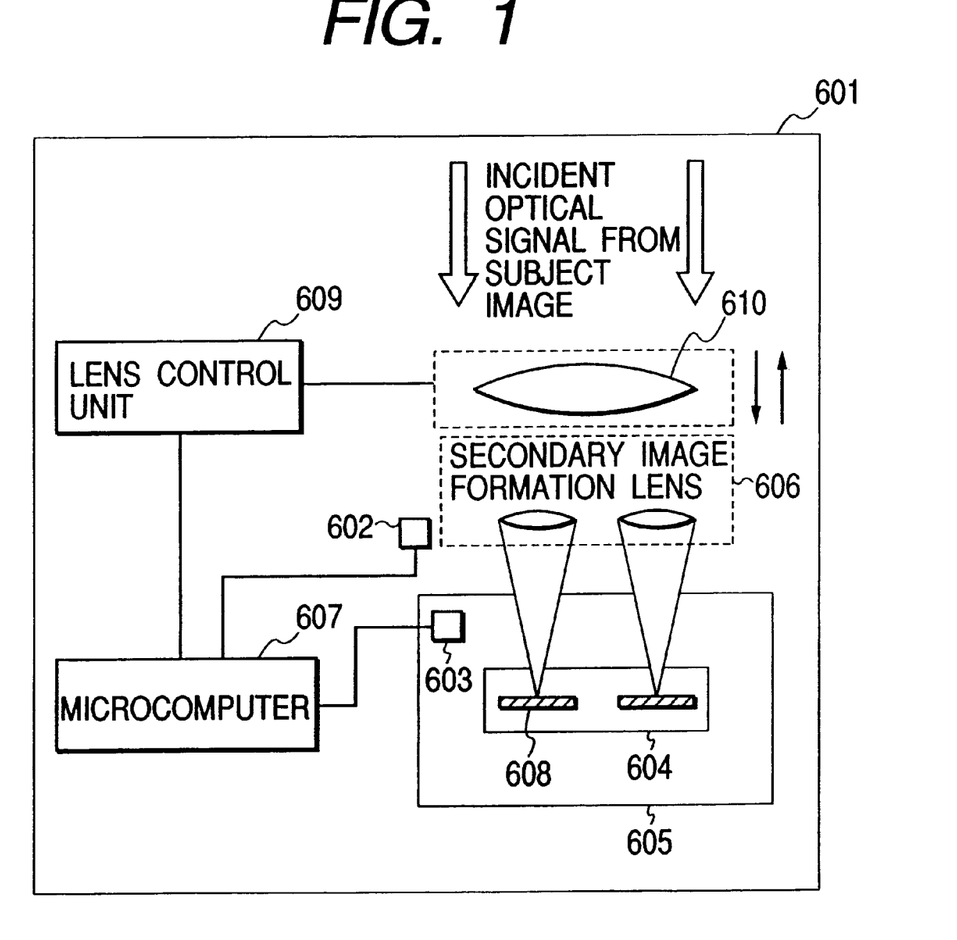
FIG. 1 is a block diagram for explaining the prior art.

A semiconductor component such as a semiconductor integrated circuit in a photoelectric conversion apparatus has a circuit for detecting changes in ambient temperature which the apparatus uses to correct operation characteristics in accordance with changes in the temperature. For example, ambient temperature changes are detected by a method as shown in FIG. 1, in a device such as an autofocus sensor (to be referred to as an AF sensor hereinafter) which must perform high-precision processing over a large temperature change range from −20° C. to +60° C. FIG. 1 is a block diagram showing an autofocus-associated part of a conventional camera.

FIG. 1 schematically shows a camera unit 601. The camera unit 601 comprises a thermometer 602 arranged outside a package 605, an AF sensor IC 604 having a photoelectric conversion element 608, a thermometer circuit 603 mounted on the package 605 of the AF sensor IC 604, a lens 610 and a secondary image formation lens 606 for receiving an incident optical signal from a subject image, a microcomputer 607 for processing an image signal, and a lens control unit 609 for controlling the position of the lens 610.

The camera unit 601 receives a subject image signal via the secondary image formation lens 606, forms images A and B corresponding to right and left lenses constituting the secondary image formation lens 606 on the photoelectric conversion element 608 of the AF sensor IC, performs correlation calculation for the subject image signal by the microcomputer 607, and controls the focal point of the camera lens 610 by operation of the lens control unit 609 to calculate the distance from the lens 610 to the subject to be photographed.

The influence of changes in ambient temperature on the camera unit 601 includes changes in characteristics of the secondary image formation lens 606 upon thermal expansion/shrinkage. If the characteristics of the secondary image formation lens 606 change depending on the ambient temperature, a subject image signal to be formed into an image on the photoelectric conversion element 608 of the AF sensor IC changes in focal length and exhibits changes that depend on the temperature.

For this reason, appropriate distance measurement can be attained only when a subject image signal is sent to the microcomputer 607, an ambient temperature outside the package 605 is detected by the thermometer 602, and an image signal output from the photoelectric conversion element 608 is properly corrected by the microcomputer 607.

The influence on the AF sensor IC 604 itself by ambient changes caused by changes in temperature of the AF sensor IC 604 itself must also be considered. The magnitude of dark current noise of the photoelectric conversion element 608 inside the AF sensor IC 604 influences the precision of the AF sensor IC 604. As the temperature of the AF sensor IC 604 rises, the dark current noise increases at a predetermined ratio. The temperature of the AF sensor IC 604 is measured by the thermometer 603 on the package 605, the value is sent to the microcomputer 607 together with a subject image signal, and dark current noise correction corresponding to the temperature value is performed for the image signal, thereby measuring the distance with high precision.

In the prior art, however, since the temperature of the AF sensor IC 604 is measured on the package 605, the temperature of the AF sensor IC 604 itself cannot be accurately measured. The AF sensor IC 604 generally exhibits a temperature that is different from the temperature of the package 605 and an external temperature due to power consumption of the AF sensor IC 604. More specifically, the temperature of the AF sensor IC 604 is higher than the respective temperatures of the package 605 and like elements due to heat generated from operation of the AF sensor IC 604, and the heat dissipates via the package 605 or air. In other words, the temperature on the semiconductor substrate of the AF sensor IC 604 cannot be accurately measured by monitoring only the temperature of the package 605 and an external temperature.

Hence, to accurately correct dark current noise for the purpose of high-precision distance measurement, the temperature on the semiconductor substrate of the AF sensor IC 604 itself must be measured.

Also, the temperature of the package 605 itself is different from the external ambient temperature, and thus the thermometer 602 for ambient temperature measurement also must be employed. The thermometer 602 for ambient temperature measurement and the thermometer 603 for the AF sensor IC 604 must be separately adopted, which leads to a large number of components and high cost.

SUMMARY OF THE INVENTION

It is an object of the present invention to downsize a photoelectric conversion apparatus for obtaining a high-precision image in spite of changes in temperature.

To achieve the above object, according to one aspect of the present invention, there is provided a semiconductor integrated circuit comprising on a single semiconductor substrate, photoelectric conversion means for photoelectrically converting an incident optical signal, a temperature dependent element which has a characteristic which exhibits a predetermined change in accordance with a change in temperature, and detection means for detecting temperature information of the temperature dependent element and temperature information received from outside of the semiconductor integrated circuit.

According to another aspect of the present invention, there is provided a photoelectric conversion apparatus comprising a semiconductor integrated circuit for photoelectrically converting an incident optical signal and including a first temperature dependent element having a characteristic which exhibits a predetermined change in accordance with a change in temperature and detection means for detecting temperature information, a device arranged outside the semiconductor integrated circuit, and at least one second temperature dependent element which is arranged inside the device and change in accordance with a change in temperature exhibits a predetermined temperature change, wherein the detection means detects temperature information of the first temperature dependent element and temperature information of the at least one second temperature dependent element.

The above and other objects, and features of the present invention will be apparent from the following description in conjunction with the accompanying drawings.

DETAILED DESCRIPTION OF THE PREFERRED EMBODIMENTS

Figure 2:
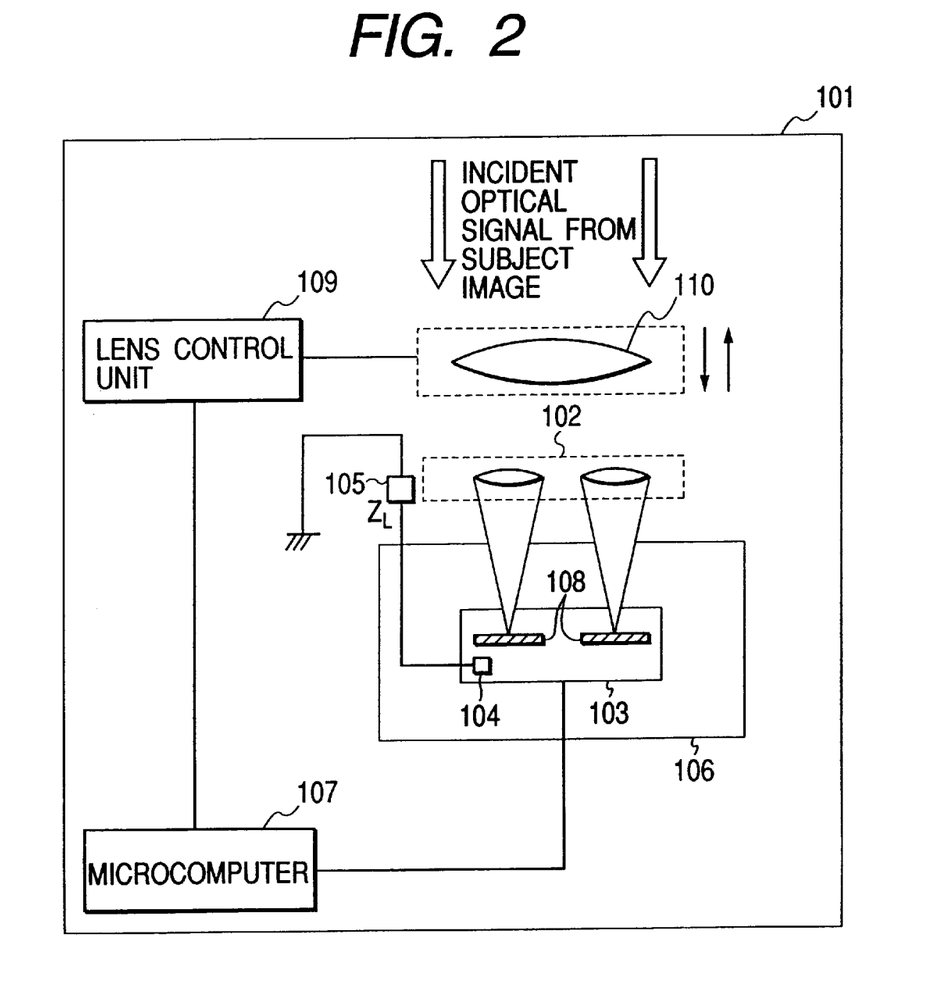
FIG. 2 is a block diagram for explaining the first embodiment of the present invention.
Figure 3:
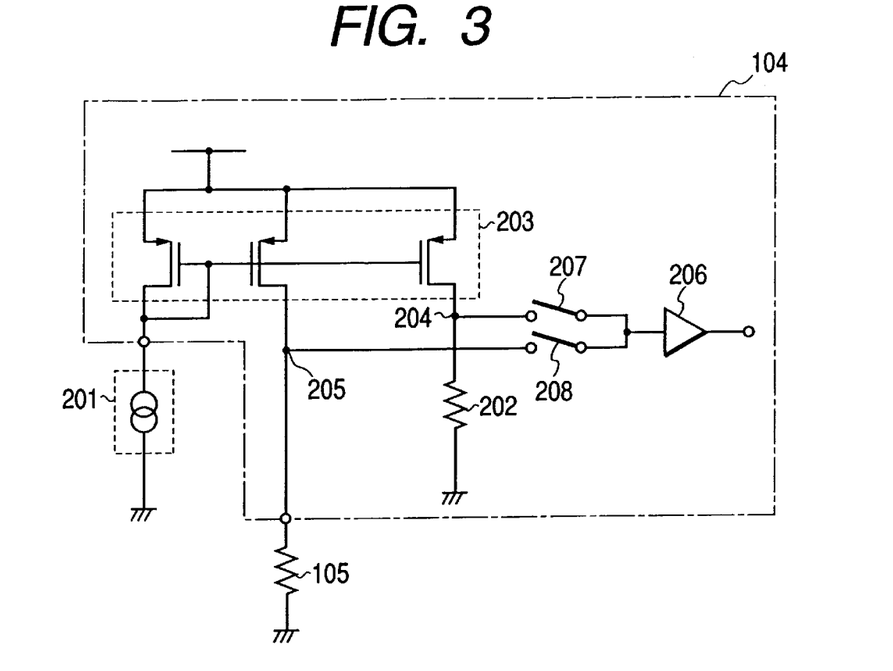
FIG. 3 is a circuit diagram for explaining a thermometer according to the first embodiment of the present invention.

FIGS. 2 and 3 are diagrams for explaining the first embodiment of the present invention.

FIG. 2 schematically shows an autofocus-associated part of a camera unit 101. The camera unit 101 comprises a lens 110 and secondary image formation lens 102 for receiving an incident optical signal from a subject image, a lens control unit 109 for controlling the lens 110, a semiconductor integrated circuit substrate 103 which is stored in a package 106 and has a photoelectric conversion element 108, a thermometer 104 based on electrical operation, which is formed in the semiconductor integrated circuit substrate 103, a load element 105 with predetermined temperature dependent characteristics, which is connected to the thermometer 104 and stored in the camera unit 101, and a microcomputer 107 for receiving a measured temperature signal and a signal from the photoelectric conversion element 108 on the semiconductor integrated circuit substrate 103.

Operation of the first embodiment will be described.

An incident optical signal from a subject image is received via the secondary image formation lens 102 and formed into an image on the photoelectric conversion element 108 of the semiconductor integrated circuit substrate 103 stored in the package 106. The thermometer 104 on the AF sensor IC measures the temperature of the AF sensor IC itself during operation of the AF sensor IC.

Detailed operation of the thermometer 104 will be explained later. The thermometer 104 measures the temperature of the AF sensor IC during operation, and sends the measured temperature as temperature data for correcting dark current noise depending on changes in temperature of the AF sensor IC to the microcomputer 107.

In the prior art, the lens 610 is corrected while a temperature that is measured by the thermometer 603 mounted on the package 605 is regarded as the temperature of the AF sensor IC. To the contrary, in the first embodiment, the internal temperature of the semiconductor integrated circuit substrate 103 itself is measured, and the lens control unit 109 is operated using this temperature data, thereby correcting the lens 110. Accordingly, dark current noise can be accurately corrected to detect the focal length with high precision.

When the characteristics and focal length of the secondary image formation lens 102 change due to changes in temperature of the secondary image formation lens 102, an image signal generated on the photoelectric conversion element 108 changes. For this reason, changes in characteristics along with changes in temperature of the load element 105 are detected, regarded as the temperature of the secondary image formation lens 102 itself inside the camera unit 101, and sent to the microcomputer 107. The microcomputer 107 predicts changes in focal length caused by changes in temperature of the secondary image formation lens 102 on the basis of the temperature value, and appropriately electrically corrects the received image signal to effectively cancel changes in focal length. Therefore, the focal length can be detected with high precision regardless of changes in temperature.

FIG. 3 shows an example of the thermometer 104 used in the first embodiment.

The thermometer 104 comprises a load element 202 having predetermined temperature dependent characteristics, a constant current source 201 serving as a current source for flowing a current through a current mirror circuit 203, the load element 105 arranged outside the package 106 within the camera unit 101, terminals 204 and 205 for measuring voltages generated in the load elements 202 and 105, a high-input-impedance amplifier 206 for externally reading out the voltage values, and switches 207 and 208 for determining which of the voltage signals is read out.

Operation of the thermometer 104 will be described.

The constant current source 201 is constituted by an element with temperature dependent characteristics which are small to a negligible degree, compared to the temperature measurement load element 202 and the like for other temperature measurements. For example, the first embodiment adopts a band gap reference voltage generation circuit for the constant current source 201 to flow a constant current. A current flowing from the constant current source 201 flows through the load elements 105 and 202 as identical currents by the current mirror circuit 203.

Note that the first embodiment uses a resistor as the load element. If this resistor is a pure resistor, its resistance changes linearly depending on the temperature, voltages generated at the terminals 204 and 205 also linearly depend on the temperature, and thus voltage signals can be easily processed.

At the terminals 204 and 205, voltages determined by a current from the constant current source and the absolute values of the resistors 202 and 105 are generated. One of the voltages selectively is amplified by the amplifier 206 via the switch 207 or 208 which is complementarily turned on/off, and read out to the external microcomputer 107.

The thermometer 104, therefore, operates as not only a thermometer for measuring the temperature of the AF sensor IC substrate 103 itself but also a thermometer for measuring the temperature outside of the AF sensor IC substrate 103 by the load element 105 that is arranged outside the package 106. As a result, the distance can be measured with high precision, and the number of thermometer components, which is large in the prior art, can be decreased to reduce the manufacturing cost of the apparatus.

Note that the first embodiment has exemplified the thermometer 104 having a circuit arrangement in which a current from the constant current source 201 is converted into a voltage by the load element 202 or the like, and the voltage is measured to detect the temperature. A feature of the first embodiment is that temperatures inside and outside the IC substrate are measured with a small number of components. However, the thermometer circuit is not limited to this embodiment, as long as the same effects can be obtained.

For example, a thermometer that converts physical changes in temperature into a current or voltage using a micromachine technique may be employed.

The first embodiment uses a resistor as a load element having temperature dependent characteristics, but is not limited to a resistor. This embodiment can adopt any element such as a diode using a p-n junction, a bipolar transistor having a short-circuited collector and base, or another semiconductor element so as to obtain a voltage that varies in accordance with a change in temperature using a constant current.

Further, the lens 110 is constituted by a single lens, but the apparatus may also be constituted by a plurality of lenses. The lens of an actual camera is constituted by a plurality of lenses or a plurality of lens groups.

The first embodiment adopts an AF sensor IC having an AF function as an example of a semiconductor integrated circuit having a photoelectric conversion function, but is not limited to this arrangement. The first embodiment can adopt various arrangements such as an area image sensor instead of the above sensor. According to the technological advantages of the first embodiment, the temperature of the image sensor itself used for an AF sensor or the like and the temperature of the camera unit 101 can be accurately measured with a small number of components and thereby correction corresponding to the respective temperatures can be attained using voltage values in image signal processing.

Figure 4:
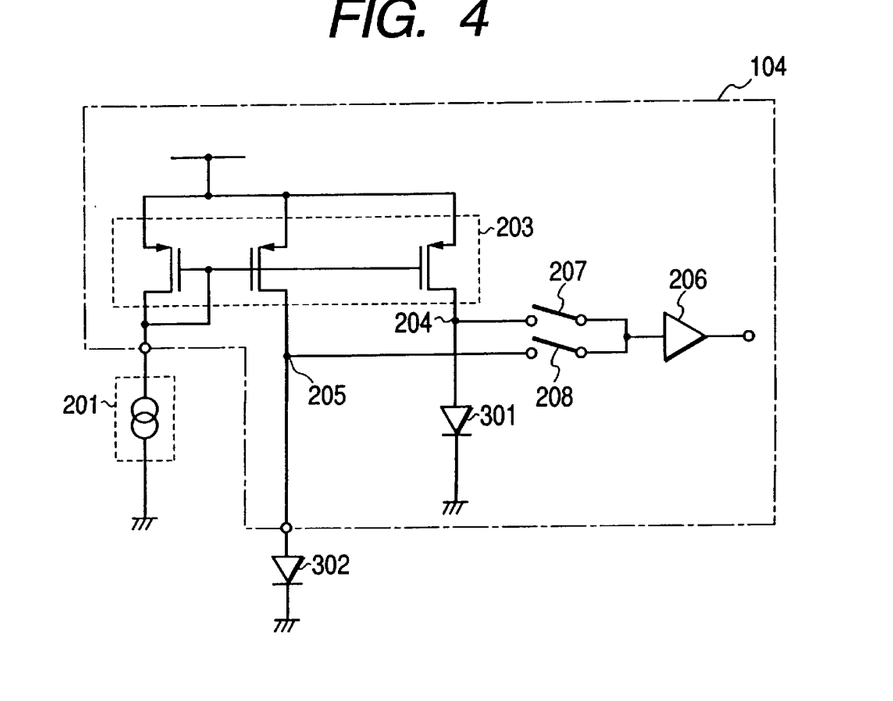
FIG. 4 is a circuit diagram for explaining the second embodiment of the present invention.

FIG. 4 is a circuit diagram showing the second embodiment of the present invention.

The arrangement of the second embodiment is the same as in the first embodiment except that diodes 301 and 302 replace the resistors 105 and 202 used in the thermometer shown in FIG. 3, and a description thereof will be omitted.

In the second embodiment, the diode 301 is formed inside an AF sensor IC using a p-n junction on a silicon substrate in correspondence with the resistor 202, and the diode 302 is arranged outside in correspondence with the resistor 105. Since the current vs. temperature characteristics of the diode depend on the temperature, voltages linearly depending on temperature can be obtained by flowing a constant current through the diodes 301 and 302, and thus the voltage signals can be easily processed.

Similar to the first embodiment, temperatures on the AF sensor IC obtained by the diodes 301 and 302 are sent as temperature signals to a microcomputer 107, and a lens control unit 109 is operated to control a lens 110, thereby appropriately correcting dark current noise and changes in focal length.

In general, the resistor changes its temperature dependent characteristics from about 0° C. to −50° C. Using the resistors 105 and 202 as load elements for the thermometer, like the first embodiment, is effective for accurate temperature measurements at high temperatures. To the contrary, using the diodes as load elements for the thermometer, like the second embodiment, allows accurate temperature measurements in a wide temperature range because the diode has better temperature dependent characteristics at low temperatures than the resistor. Even in an environment having a wide temperature range, dark current noise and changes in focal length can be appropriately corrected to realize high-precision distance measurements.

Figure 5:
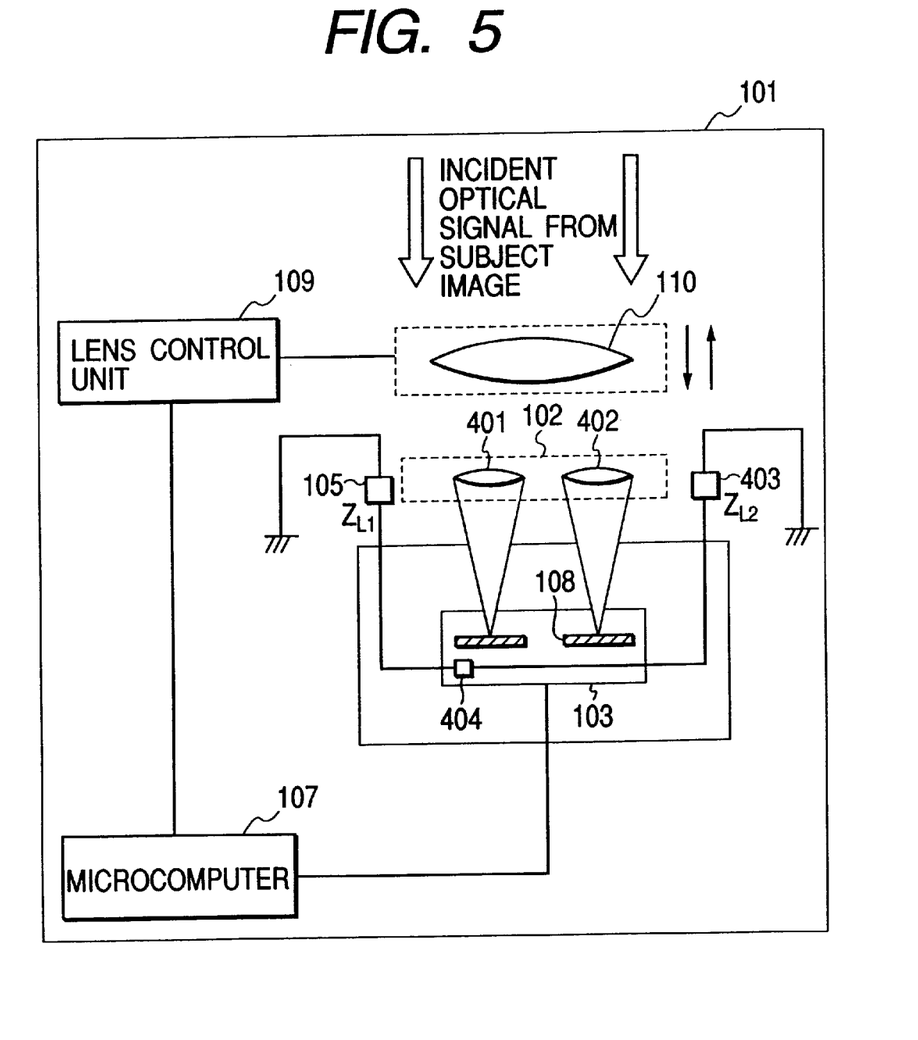
FIG. 5 is a block diagram for explaining the third embodiment of the present invention.

FIG. 5 is a block diagram showing the third embodiment of the present invention.

The arrangement of the third embodiment is the same as in the first and second embodiments except that another thermometer is added to the arrangement described in the first embodiment to provide respective thermometers for the two lenses.

More specifically, load elements 105 and 403 for detecting changes in temperature are respectively set near left and right lenses 401 and 402 constituting a secondary image formation lens 102 so as to measure the temperatures of the respective lenses. The load elements 105 and 403 are connected to an internal chip thermometer 404.

Operation of the third embodiment will be explained.

An incident optical signal from a subject image is received by the left and right lenses 401 and 402 constituting the secondary image formation lens 102, and formed into an image on the photoelectric conversion element of a semiconductor integrated circuit substrate 103 having an AF function. The internal thermometer 404 of the AF sensor IC measures the temperature of the AF sensor IC itself during operation of the AF sensor IC.

Note that operation of the thermometer 404 will be described later.

After the temperature is measured, a microcomputer 107 receives the temperature signal, and a lens control unit 109 properly operates to correct the focal point using a signal obtained by correlation calculation.

At this time, appropriate correction must be performed for changes in focal length using changes in characteristics of the left and right lenses 401 and 402 caused by changes in temperatures of the left and right lenses 401 and 402. For this purpose, the load elements 105 and 403 are respectively provided for the left and right lenses 401 and 402 to measure the lens temperatures by the respective load elements.

After that, temperature signals and an image signal from a photoelectric conversion element 108 are sent to the microcomputer 107. The microcomputer 107 corrects changes in image signal caused by changes in temperatures of the left and right lenses 401 and 402, calculates the correlation, and controls the lens.

This arrangement makes it possible to measure not the temperature of the whole secondary image formation lens 102 but respective temperatures of the left and right lenses 401 and 402 constituting the secondary image formation lens 102. The image signals of images A and B formed by the left and right lenses 401 and 402 can be separately corrected to measure the distance at higher precision.

As a feature of the third embodiment, the focal lengths of the left and right lenses are corrected in accordance with their temperatures. The effects obtained by the third embodiment are not limited to this arrangement. For example, when a plurality of lenses for forming the image A are aligned in a line, and the focal lengths of the respective lenses are to be corrected, temperature detection load elements can be set near these lenses to measure the temperatures of the lenses and correct the focal lengths in accordance with the measured temperatures. The third embodiment exhibits greater effects especially when the temperatures of the lenses are different from each other because they are separated (apart) from each other.

Figure 6:
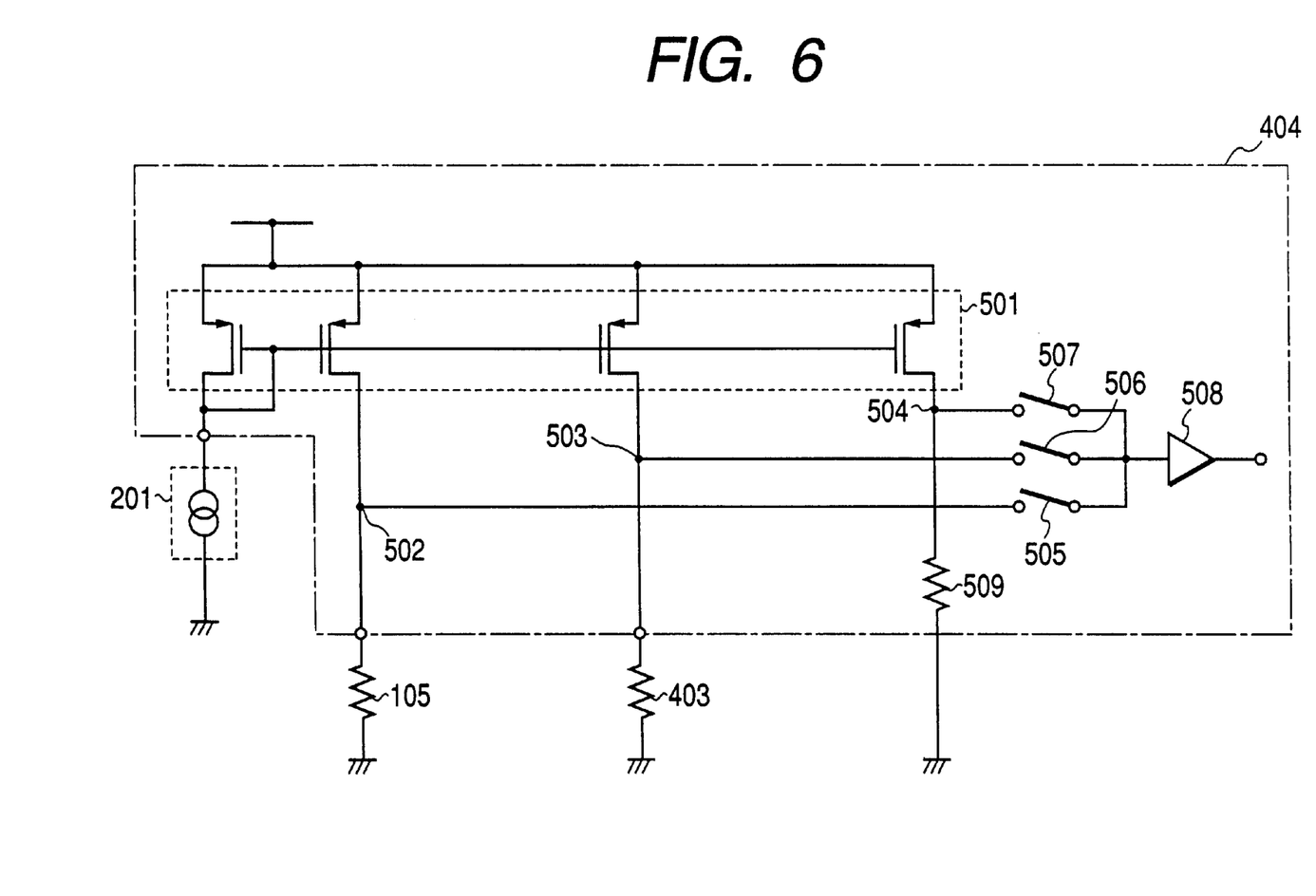
FIG. 6 is a circuit diagram for explaining a thermometer according to the third embodiment of the present invention.

FIG. 6 is a circuit diagram showing an example of the thermometer 404. In the thermometer 404, another load element 509 is added to the thermometer 104 described in the first embodiment. The remaining arrangement is the same as the thermometer 104, and a description thereof will be omitted.

Operation of the thermometer 404 is the same as the thermometer 104 described in the first embodiment. A current from a constant current source 201 flows through the resistors 105, 403, and 509 via a current mirror circuit 501 to generate predetermined voltages at terminals 502, 503, and 504.

If the resistors 105, 403, and 509 are pure resistors, their resistances change linearly depending on temperatures, voltages generated at the terminals 502, 503, and 504 also linearly depend on their respective temperatures, and thus voltage signals can be easily processed.

One of three voltage values is exclusively read out by switches 505, 506, and 507 and sent to a high-impedance amplifier 508 to measure the temperature of a desired position (on the integrated circuit substrate 103, left lens 401, or right lens 402). By a corresponding temperature signal, dark current noise and the focal length can be properly corrected to realize high-precision distance measurements.

Note that the third embodiment adopts a resistor as a load element exhibiting temperature dependent changes, but is not limited to this. For example, the temperature can be measured using a diode as described in the second embodiment.

In the prior art, dark current noise of the AF sensor IC is corrected based on the temperature of the package 605. To the contrary, according to the first to third embodiments, dark current noise can be corrected based on the temperature of the photoelectric conversion apparatus itself on the AF sensor IC substrate 103, thereby realizing high-precision distance measurement.

Since the ambient temperature measurement thermometer and the AF sensor thermometer are integrated, either temperature can be easily measured by switch operation, while in the prior art the respective thermometers are provided separately. The temperature inside the camera unit 101 can be measured with a small number of components to reduce the apparatus cost.

In addition, a thermometer having a high affinity with the semiconductor manufacturing process can be formed in the semiconductor IC substrate.

Even in a semiconductor device in which any diode is difficult to manufacture technically or in terms of cost, high-precision distance measurement can be performed using a resistor. Further, the component cost can be reduced using a low-cost external resistor.

Still further, the temperature can be accurately measured in a low-temperature range by using a diode.

Many widely different embodiments of the present invention may be constructed without departing from the spirit and scope of the present invention. It should be understood that the present invention is not limited to the specific embodiments described in the specification, except as defined in the appended claims.

What is claimed is:

1. A semiconductor integrated circuit comprising on a single semiconductor substrate:
   photoelectric conversion means for photoelectrically converting an incident optical signal;
   a temperature dependent element having a characteristic which exhibits a predetermined change in accordance with a chance in temperature; and
   detection means for detecting temperature information of said temperature dependent element and temperature information received from outside said semiconductor integrated circuit.

2. A circuit according to claim 1, wherein said detection means comprises a constant current circuit for supplying a constant current to said temperature dependent element and an element outside said semiconductor integrated circuit from which said detection means receives temperature information.

3. A circuit according to claim 1, wherein said temperature dependent element comprises a resistor.

4. A circuit according to claim 1, wherein said temperature dependent element comprises a diode.

5. A photoelectric conversion apparatus comprising:
   (A) a semiconductor integrated circuit that photoelectrically converts an incident optical signal, said circuit including:
      (a) a first temperature dependent element having a characteristic which exhibits a predetermined change in accordance with a change in temperature; and
      (b) detection means for detecting temperature information;
   (B) a device arranged outside said semiconductor integrated circuit; and
   (C) at least one second temperature dependent element which is arranged inside said device and has a characteristic that exhibits a predetermined change in accordance with a chance in temperature, wherein said detection means detects temperature information of said first temperature dependent element and temperature information of said at least one second temperature dependent element.

6. An apparatus according to claim 5, wherein said device includes a secondary image formation lens.

7. An apparatus according to claim 5, wherein said detection means comprises a constant current source circuit, and detects temperature information by flowing a current from said constant current source circuit through said first temperature dependent element and said at least one second temperature dependent element, and measuring a potential difference generated between a terminal of said first temperature dependent element and a terminal of said at least one second temperature dependent element.

8. An apparatus according to claim 6, further comprising means for correcting, in accordance with the detected temperature information, a change in an image signal caused by a change in focal length along with a change in shape corresponding to a temperature of said secondary image formation lens.

9. An apparatus according to claim 5, wherein said first temperature dependent element comprises a resistor.

10. An apparatus according to claim 5, wherein said at least one second temperature dependent element comprises a resistor.

11. An apparatus according to claim 5, wherein said first temperature dependent element comprises a diode.

12. An apparatus according to claim 5, wherein said at least one second temperature dependent element comprises a diode.

13. A semiconductor integrated circuit comprising on a single semiconductor substrate:
   a photoelectric converter arranged to receive an incident optical signal and provide an output signal;
   a temperature dependent element having a characteristic which exhibits a predetermined change in accordance with a change in temperature; and
   a temperature information detector connected to said temperature dependent element and arranged for receiving temperature information from an element outside said semiconductor integrated circuit.

14. A circuit according to claim 13, wherein said temperature information detector comprises a constant current circuit for supplying a constant current to said temperature dependent element and the element outside said semiconductor integrated circuit.

15. A circuit according to claim 13, wherein said temperature dependent element comprises a resistor.

16. A circuit according to claim 13, wherein said temperature dependent element comprises a diode.

17. A photoelectric conversion apparatus comprising:
(A) a semiconductor integrated circuit that has a photoelectric converter arranged to receive an incident optical signal and provide an output signal, said circuit including:
   (a) a first temperature dependent element having a characteristic which exhibits a predetermined change in accordance with a change in temperature; and
   (b) a temperature information detector that detects temperature information;
(B) a device arranged outside said semiconductor integrated circuit; and
(C) at least one second temperature dependent element which is arranged inside said device and has a characteristic that exhibits a predetermined change in accordance with a change in temperature,
wherein said temperature information detector detects temperature information of said first temperature dependent element and temperature information of said at least one second temperature dependent element.

18. An apparatus according to claim 17, wherein said device includes a secondary image formation lens.

19. An apparatus according to claim 17, wherein said temperature information detector comprises a constant current circuit, and detects temperature information by flowing a current from said constant current circuit through said first temperature dependent element and said at least one second temperature dependent element, and measuring a potential difference generated between a terminal of said first temperature dependent element and a terminal of said at least one second temperature dependent element.

20. An apparatus according to claim 18, further comprising means for correcting, in accordance with the detected temperature information, a change in an image signal caused by a change in focal length along with a change in shape corresponding to a temperature of said secondary image formation lens.

21. An apparatus according to claim 17, wherein said first temperature dependent element comprises a resistor.

22. An apparatus according to claim 17, wherein said at least one second temperature dependent element comprises a resistor.

23. An apparatus according to claim 17, wherein said first temperature dependent element comprises a diode.

24. An apparatus according to claim 17, wherein said at least one second temperature dependent element comprises a diode.

* * * * *

UNITED STATES PATENT AND TRADEMARK OFFICE
CERTIFICATE OF CORRECTION

PATENT NO. : 6,184,511 B1
DATED : February 6, 2001
INVENTOR(S) : Yuichiro Yamashita Page 1 of 1

It is certified that error appears in the above-identified patent and that said Letters Patent is hereby corrected as shown below:

Title page,
Item [54], "PHOTOELECTRIC CONVERSION APPARATUS" should read
-- PHOTOELECTRIC CONVERSION APPARATUS HAVING MEANS FOR DETECTING TEMPERATURE INFORMATION --

Column 1,
Line 16, "method" should read -- method, --.

Column 2,
Line 56, "and" should read -- and that has a characteristic which exhibits a predetermined --.
Line 57, "exhibits a predetermined temperature change" should be deleted.

Column 8,
Line 17, "temperature, wherein" should read -- temperature, ¶wherein --.

Signed and Sealed this

Twenty-sixth Day of March, 2002

Attest:

*Attesting Officer*

JAMES E. ROGAN
*Director of the United States Patent and Trademark Office*